United States Patent
Shen et al.

(10) Patent No.: US 9,792,522 B2
(45) Date of Patent: Oct. 17, 2017

(54) WEATHER INFORMATION EXTRACTION USING SEQUENTIAL IMAGES

(71) Applicant: BloomSky, Inc., Menlo Park, CA (US)

(72) Inventors: Xinning Shen, Menlo Park, CA (US); Wei Chu, Menlo Park, CA (US)

(73) Assignee: BloomSky, Inc., Menlo Park, CA (US)

( * ) Notice: Subject to any disclaimer, the term of this patent is extended or adjusted under 35 U.S.C. 154(b) by 77 days.

(21) Appl. No.: 14/956,166

(22) Filed: Dec. 1, 2015

(65) Prior Publication Data

US 2017/0154237 A1   Jun. 1, 2017

(51) Int. Cl.
| | |
|---|---|
| G06K 9/62 | (2006.01) |
| G06K 9/46 | (2006.01) |
| G06T 7/40 | (2017.01) |
| G06T 7/00 | (2017.01) |

(52) U.S. Cl.
CPC ......... *G06K 9/4652* (2013.01); *G06K 9/4604* (2013.01); *G06T 7/0085* (2013.01); *G06T 7/408* (2013.01); *G06T 2207/30192* (2013.01)

(58) Field of Classification Search
CPC .... H04N 19/14; H04N 19/167; H04N 19/186; H04N 21/23418; G06T 2207/10016; G06T 2207/10024; G06T 7/90; G06K 2009/00738; G06K 9/00697; G06K 9/00744; G06K 9/3233
See application file for complete search history.

(56) References Cited

U.S. PATENT DOCUMENTS

| | | | |
|---|---|---|---|
| 5,848,378 A | 12/1998 | Shelton et al. | |
| 5,963,670 A * | 10/1999 | Lipson | G06F 17/3025 |
| | | | 382/224 |
| 6,961,061 B1 | 11/2005 | Johnson et al. | |
| 2009/0208106 A1 * | 8/2009 | Dunlop | G06K 9/00664 |
| | | | 382/173 |
| 2009/0226033 A1 | 9/2009 | Sefcik | |
| 2010/0100328 A1 | 4/2010 | Moore et al. | |
| 2013/0004096 A1 * | 1/2013 | Goh | H04N 19/117 |
| | | | 382/260 |
| 2015/0261803 A1 | 9/2015 | Song et al. | |
| 2015/0332127 A1 | 11/2015 | Zheng et al. | |

OTHER PUBLICATIONS

International Patent Application No. PCT/US2016/64122; Int'l Search Report and the Written Opinion; dated Feb. 15, 2017; 18 pages.
Nelder et al.; "A Simplex Method for Function Minimization"; The Computer Journal; vol. 7 Issue 4; 1965; p. 308-313 (published before this application Dec. 2015).

\* cited by examiner

*Primary Examiner* — Eueng-Nan Yeh
(74) *Attorney, Agent, or Firm* — Baker & Hostetler LLP

(57) ABSTRACT

Techniques for weather information extraction using image data are described herein. In accordance with the present disclosure, economical weather data collection devices may be installed in any places on the earth, and form a dense network of weather data collection devices. Preferably, these weather data collection devices include image capture components that may capture series of sequential images over time (i.e., image streams) from any particular locations. The disclosed techniques include extracting a sky portion from a series of time-sequenced images. The extracted sky portion may be used for determining cloud coverage, a sun track, and so on, thereby enabling to provide accurate weather forecast as well as other weather data mining abilities.

16 Claims, 15 Drawing Sheets

| User ID | Device ID | Image Data | Temperature | Humidity | Barometric Pressure | UV Exposure | Precipitation | Location | Time | Date | ... |
|---|---|---|---|---|---|---|---|---|---|---|---|
| | | | | | | | | | | | |
| | | | | | | | | | | | |
| | | | | | | | | | | | |
| ... | ... | ... | ... | ... | ... | ... | ... | ... | ... | ... | |

| User ID | Device ID | Determined Cloudiness | Location | Time | Date |
|---|---|---|---|---|---|
| | | | | | |
| | | | | | |
| | | | | | |
| ... | ... | ... | ... | ... | ... |

FIG. 7

(Day 2 Image Library)

(Day 2 Image Library)

US 9,792,522 B2

WEATHER INFORMATION EXTRACTION USING SEQUENTIAL IMAGES

BACKGROUND

Conventional weather forecasters have a variety of tools to obtain weather information, such as weather stations and weather satellites. Weather stations can collect numerical data of wind speed, air temperature, air pressure, and so on. Weather satellites can show cloud formations and large-scale weather events, such as hurricanes. Even so, weather stations are spread miles apart, and typically limited to gather numerical data. Weather satellites are positioned thousands of miles above the earth, and limited to view large-scale weather events. Subject to various limitations, current weather forecasts' accuracy cannot fulfill needs of people. For example, outdoor enthusiasts or avid travelers need accurate and real-time weather information of a particular area to arrange their outdoor or travelling plans. Likewise, business people need precise weather predictions to optimize processes and decrease weather-related economic risks.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is a simplified diagram illustrating example data matrices of a weather database that may be used in accordance with the present disclosure.

FIG. 7 is a simplified diagram illustrating example data matrices of a cloud cover database that may be used in accordance with the present disclosure.

DETAILED DESCRIPTION

Figure 1:
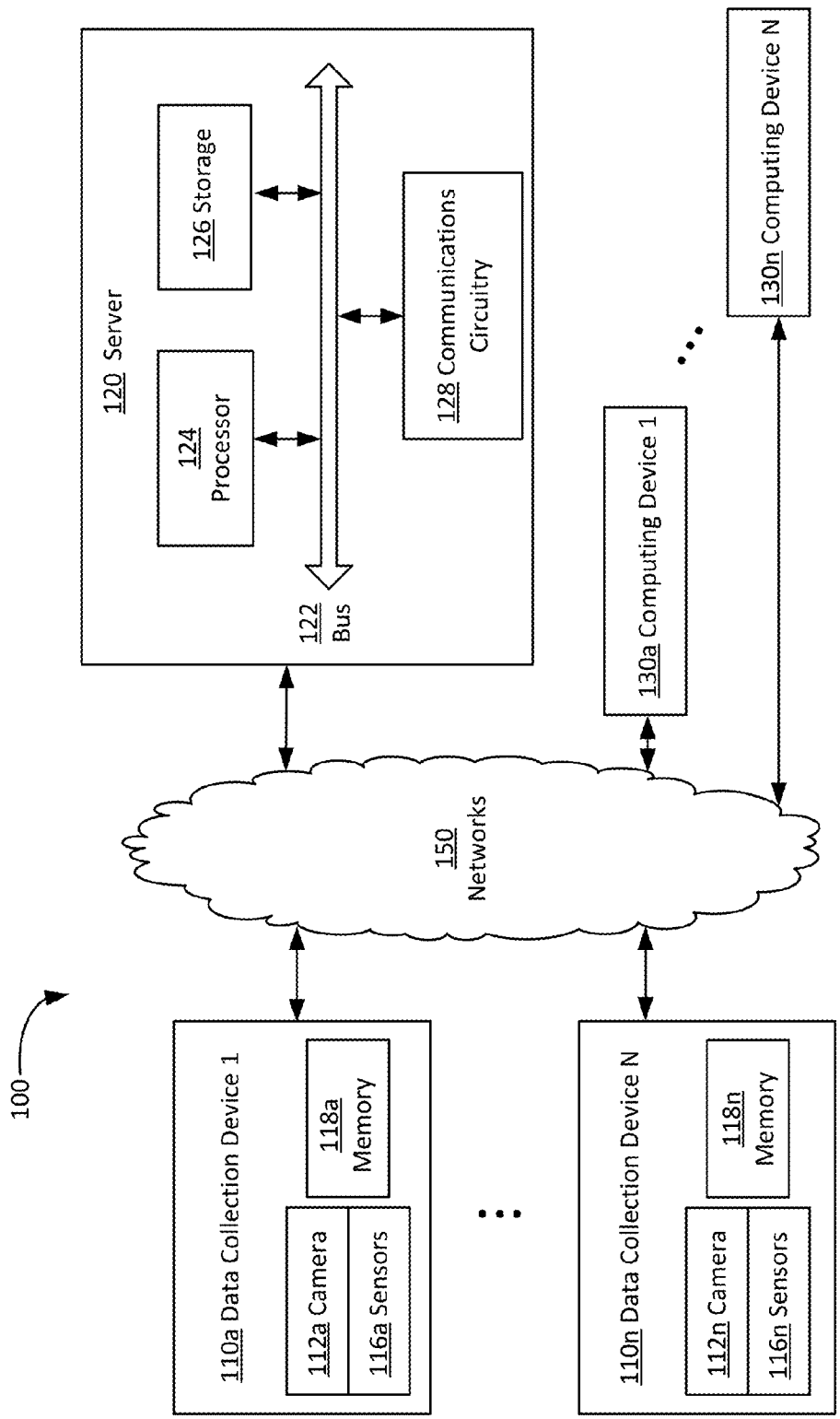
FIG. 1 is a schematic diagram illustrating an example system for collecting and processing weather data that may be used in accordance with the present disclosure.

Techniques for weather information extraction using image data are described herein. In accordance with the present disclosure, economical weather data collection devices may be installed in any places on the earth, and form a dense network of weather data collection devices. Preferably, these weather data collection devices include image capture components that may capture series of sequential images over time (i.e., image streams) from any particular locations. The disclosed techniques include extracting a sky portion from a series of time-sequenced images. The extracted sky portion may be used for determining cloud coverage, a sun track, and so on, thereby enabling to provide accurate weather forecast as well as other weather data mining abilities.

In some examples, a series of time-sequenced images may be received for extracting a sky portion of a given location. Each image among the series of time-sequenced images comprises a plurality of corresponding data elements. Extraction of a sky portion may further comprise identifying a first type of data elements among the plurality of corresponding data elements of each image based on color values. In response to a determination that a corresponding data element is identified as a first type of data element in less than a certain number of images among the series of images, the corresponding data element is removed from the first type of data elements. A representative may be generated, and the representative comprises at least a set of neighbouring first type of data elements indicative of at least a sky component.

Extraction of a sky portion may further comprise identifying a second type of data elements among the plurality of corresponding data elements of each image among the series of images by an edge detector, wherein the second type of data elements are indicative of a non-edge portion. In response to a determination that a corresponding data element is identified as a second type of data element in less than a predetermined number of images among the series of images, the corresponding data element is removed from the first types of data elements.

In some cases, a generated representative may comprise a plurality of sky components, and then the generated representative may need additional modifications. In response to a determination that a sky component has a contour area less than a certain value, this sky component is removed from the plurality of sky components. A first sky component with the largest contour area is identified among the plurality of sky components. Upon determining that a correlation coefficient of a second sky component relative to the largest sky component is less than a threshold, the second sky component is removed from the plurality of sky components. A modified representative may be generated, wherein the modified representative comprises remaining sky components that are indicative of a sky portion.

As described herein, the extracted sky portion may be used for, among other things, determining cloud coverage (i.e., cloudiness). In some examples, the extracted sky portion may be used to mask an image captured from the same location so as to obtain a sky portion of the image. The sky portion of the image comprises a plurality of data elements. The plurality of data elements may be classified into other types of data elements, for example, a third type of data elements and a fourth type of data elements based on their color values. A sun portion formed by a set of neighbouring data elements among the third type of data elements may be identified by a sun detector. The set of neighbouring data elements may be removed from the third type of data elements. A cloudiness of the sky portion of the image may then be determined based on a proportion of the third type of data elements to the plurality of data elements.

As described herein, the extracted sky portion may also be used for determining a sun track. In some examples, at least two image streams captured during at least two successive days may be received for determining a sun track. The extracted sky portion may be used to mask an image among the at least two image streams to define a sky portions of the image. At least a pair of corresponding images among the at least two image streams may be identified based on image capture time. Upon detecting that the at least a pair of corresponding images comprise respective sun portions, it may then be determined that the sun portions overlap each other. A centroid of the at least a pair of overlapped sun portions may be identified as a sample. The sun track may be generated based on centroid samples identified among the at least two image streams.

The disclosed techniques may also include a sun detector. In some examples, the sun detector may comprise identifying at least a set of neighboring data elements based on hue values. In some cases, there may be a plurality of portions formed by the at least a set of neighboring data elements. The largest contour area Cs may be identified among the plurality of portions, and the Cs may then be enclosed by a minimum geometric shape Cir. The portion with the largest contour area Cs may be detected as a sun portion upon determining that an area ratio of Cs to Cir is greater than a threshold and a radius of Cir falls within a predetermined range. In some examples, the disclosed techniques may further comprise receiving data corresponding to a sun track and verifying that the detected sun portion is a real sun portion in response to a determination that the detected sun portion intersects with the sun track.

FIG. 1 is a schematic diagram illustrating an example system 100 for collecting and processing weather data that may be used in accordance with the present disclosure. As shown, the system 100 comprises a plurality of data collection devices 110a . . . , and 110n (collectively, 110), at least a server 120, and a plurality of computing devices 130a . . . , and 130n (collectively, 130). The data collection devices 110 and the computing devices 130 may communicate with the server 120 via one or more networks 150.

The data collection devices 110 are used to capture sky images and other weather data, such as temperature, humidity, barometric pressure, UV exposure, precipitation, and so on. The data collection devices 110 may be installed in any places on the earth, thereby forming a dense network of weather data collection devices 110. For instance, the data collection devices 110 may be installed in the ground or mounted on any suitable structures. Preferably, the data collection devices 110 are installed in locations with clear view of sky and as far as possible away from tall obstacles, such as trees, buildings, and fences.

The data collection devices 110 comprise cameras 112 for capturing sky images. The cameras 112 may be any suitable cameras, such as ultra-wide angle HD cameras. By way of example and without limitation, the cameras 112 may be programmed to turn on 30 minutes before sunrise and turn off 30 minutes after sunset. The cameras 112 may also be programmed to take pictures every certain time interval, such as every three minutes. In some examples, the cameras 112 each may be fixed towards a particular view of sky, and they each may gather a series of time-sequenced sky images of a particular view every day (i.e., an image stream). At the end of each day, a series of sky images captured from a particular location may be combined into a spectacular time-lapse video for users to view and share. The data collection devices 110 may capture numerous series of time-sequenced sky images from various locations around the world.

Weather information may be accurately extracted from the time-sequenced sky images captured by the data collection devices 110. In some examples, these images may be used to determine cloud coverage, cloud darkness, and cloud patterns at different times and locations so as to obtain comprehensive information relating to how a weather system or event, such as a thunderstorm system or precipitation, evolves over time at a given location or over a large region, thereby enabling, for example, accurate weather forecasting.

The data collection devices 110 may also comprise sensors 116 for gathering temperature, humidity, barometric pressure, UV exposure, precipitation, and other data collection sensors. The sensors can be any suitable sensors for measuring corresponding atmospheric parameters. For instance, rain sensors may be used to measure precipitation. Preferably, the rain sensors are able to distinguish precipitation from other moisture. By way of example and without limitation, photometric sensor may be used to measure daylight brightness and exposure. The data collection devices 110 may comprise memories 118 for storing image and numerical data for buffering and to send to over a network connection that may have intermittent connectivity.

Typically, the data collection devices 110 may transmit data via the networks 150 to the server 120 for storing and processing. The server 120 may host one or more applications configured to manage services. For example, the server 120 may be configured to validate the computing devices 130 before they are authorized to access stored data. The server 120 may maintain information related to a user account including account details and others. The server 120 may operate one or more image libraries comprising images captured by the data collection devices 110, which may be accessed by the computing devices 130. Also, the server 120 may host one or more applications configured to interact with applications stored on the computing devices 130.

The server 120 may include a bus 122 which interconnects major components of the server 120, such as one or more processors 124, one or more storage devices 126, and communications circuitry 128. The processors 122 may be any suitable programmable control devices. The processors 122 may process data captured by the data collection devices 110 and extract various weather/climate information from image data. The storage devices 126 may be integral with the server 120 or may be separate and accessed through an interface. The storage devices 126 may store image streams captured by the data collection devices 110, software for implementing various functions on the server 120, and other data. The communications circuitry 128 may include one or more interfaces to allow the server 120 to communicate with the data collection devices 110, the computing devices 130, other servers, and/or databases via the one or more networks 150. The server 120 may be a cloud-based server.

Figure 2:
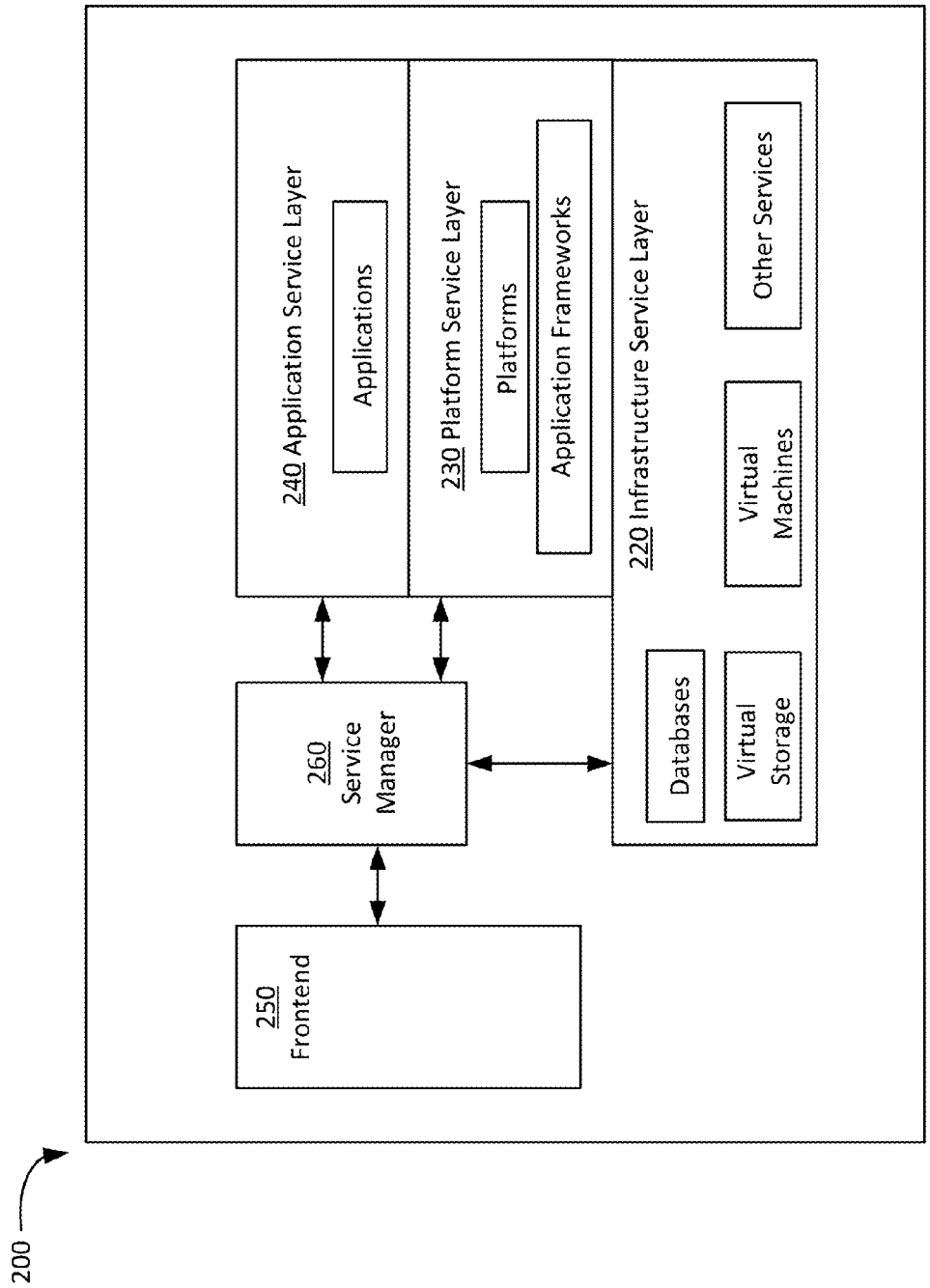
FIG. 2 is a schematic diagram illustrating an example cloud-based server that may be used in accordance with the present disclosure.

FIG. 2 is a schematic diagram illustrating an example cloud-based server 200 that may be used in accordance with the present disclosure. The cloud-based server 200 may provide infrastructure services, platform services, and software application services. The infrastructure services may include virtualized resources, such as virtual machines, virtual storage, and so on. The infrastructure services may also include virtualized services, such as database services and others. Each of these infrastructure services may be deployed in an infrastructure service layer 220.

The scale and various aspects, such as data, connectivity, and dependency relationships within and between service components, of an infrastructure service deployment are configurable by an administrator user. For instance, the administrator user may submit a configuration specification to the cloud-based server 200 via a frontend interface 250 and service manager 260. The configuration specification can be translated into infrastructure and kernel level APIs calls that create, re-create, move, or delete components such as virtual machines and services, and assign or change attributes of the components.

In addition to the infrastructure services, the cloud-based server 200 may also provide platform services, such as an environment for running virtual machines or a framework for developing and launching a particular type of software applications. The platform services may be implemented in a platform service layer 230 over the infrastructure service layer 220, and may employ one or more infrastructure services configured in a particular manner. Configuration of platform services can be accomplished by program code written according to the APIs of the platform services and, optionally, the APIs of the infrastructure services that are employed in enabling the platform services.

In some examples, the cloud-based server 200 may also provide software application services in an application service layer 240. A software application can be installed on one or more virtual machines or deployed in an application framework in the platform service layer 230. The software application can also communicate with one or more infrastructure service components, such as databases, in the infrastructure layer 220. The installation and configuration of the software application in the application service layer 240 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

As mentioned above, the data transmitted by the data collection devices 110 may be stored in the server 120, such as the cloud-based server 200. The data may also be stored in a separate cloud storage server. The data collection devices 110 each may be associated with a user identifier (i.e., user ID) and a device identifier (i.e., device ID). The data transmitted by the data collection devices 110 may comprise their respective user ID, device ID, and location information in addition to the captured images and other weather data. In some examples, the data collection devices 110 each may be associated with a corresponding computing device; the user ID, device ID, and location information may be transmitted by the corresponding computing device to the server 120 or other separate cloud storage server. One or more weather databases may be created to contain data transmitted by the data collection devices 110 and/or the corresponding computing devices 130.

FIG. 3 is a simplified diagram illustrating example data matrices 300 of a weather database that may be used in accordance with the present disclosure. As shown, data matrices 300 include user ID, device ID, image data, temperature, humidity, barometric pressure, UV exposure, precipitation, location, time, date, and so on. One or more weather databases may be organized in any suitable way that can support data processing and information extraction, such as cloudiness determination based on image data that will be described in greater detail below. The weather databases may be updated periodically in order to reflect new data. The weather databases may be broken into subsets of data and processed in parallel by separate systems, such as the server 120 and the computing devices 130.

Figure 4:
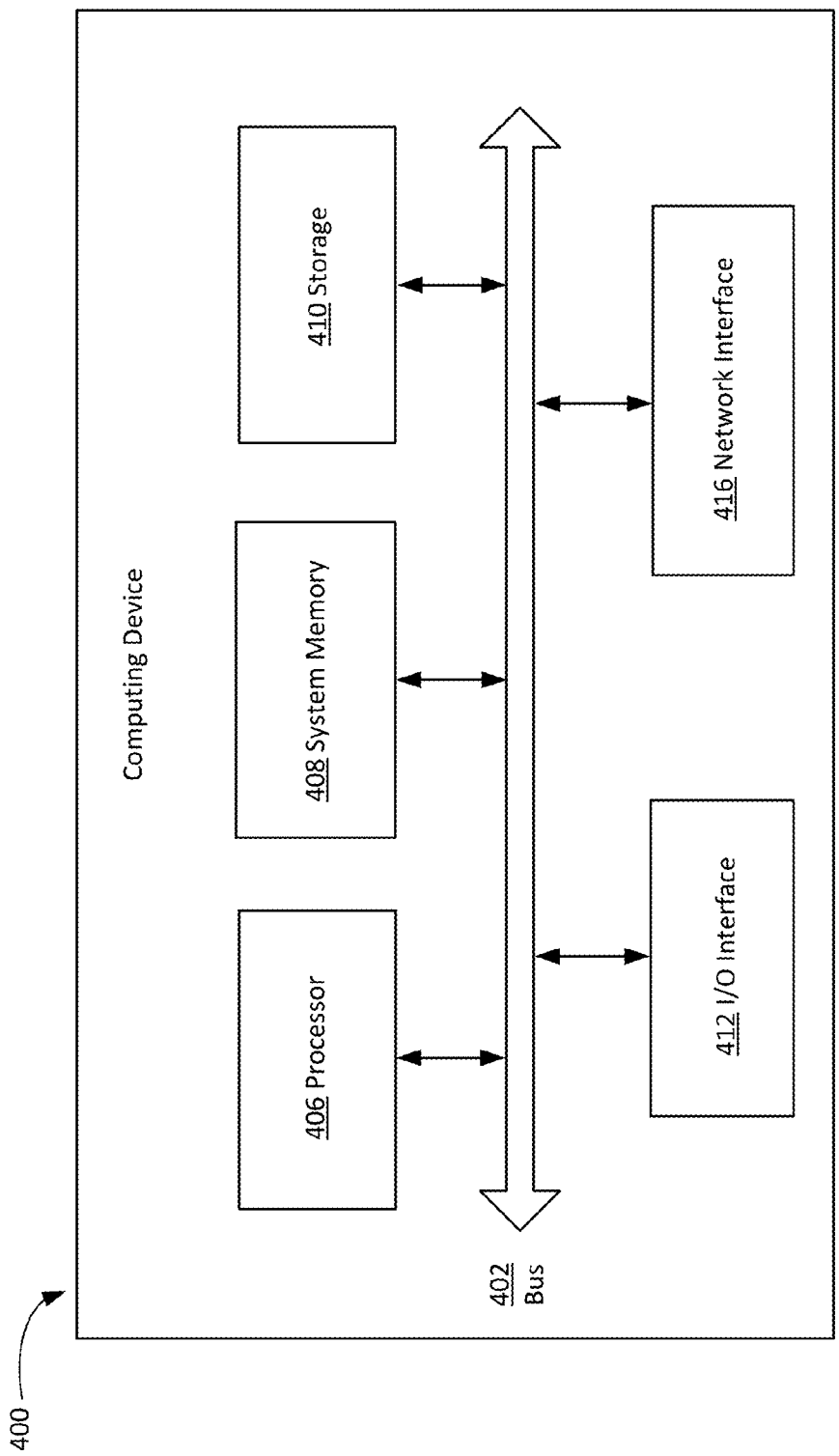
FIG. 4 is a schematic diagram illustrating an example computing device that may be used in accordance with the present disclosure.

FIG. 4 is a schematic diagram illustrating an example computing device 400 that may be used as one of the computing devices 130. The computing device 400 may be a smartphone, a tablet computer, a laptop computer, a desktop computer, or any other sort of device. The computing device 400 includes a processor 406 that is coupled through a bus 402 to a system memory 408, a permanent storage 410, input/output (I/O) interface 412, and a network interface 416. The processor 406 may be any suitable programmable processing unit capable of executing instructions. For example, in various embodiments, the processors 406 may be embedded processors implementing any of a variety of instruction set architectures. The system memory 408 may be a volatile read-and-write memory, such as a random access memory.

The permanent storage 410 may be local or remote, and the permanent storage 410 may store instructions and data, such as the data captured by the data collection devices 110. The I/O interface 412 may provide the computing device 400 communication with different peripherals, such as a display, a keyboard, a mouse, etc. The I/O interface 412 may be configured to coordinate I/O traffic between the processor 406, the system memory 408, the permanent storage 410, the network interface 416, and any other peripherals. The network interface 416 may be configured to support communication via any suitable wired or wireless general data networks or telecommunications/telephony networks, allowing data to be exchanged between the computing device 400 and other devices, such as the data collection devices 110 and the server 120, including the cloud-based server 200.

The networks 150 may be local networks, wide-area networks (including the Internet), telecommunications/telephony networks, any other suitable communication networks. The networks 150 may be implemented on any suitable platform including wired and/or wireless networks. The network 150 may be part of a public and/or a private network and may also include one or more gateways, which facilitate the transfer of data between devices using different protocols.

As mentioned above, the images captured by the data collection devices 110 may be used to accurately extract weather/climate information. For instance, the images gathered by the data collection devices 110 may be used to determine cloud cover. Cloud cover refers to the fraction of the sky obscured by clouds when observed from a particular location. Cloud cover is also known as cloudiness, cloudage, or cloud amount.

Figure 5:
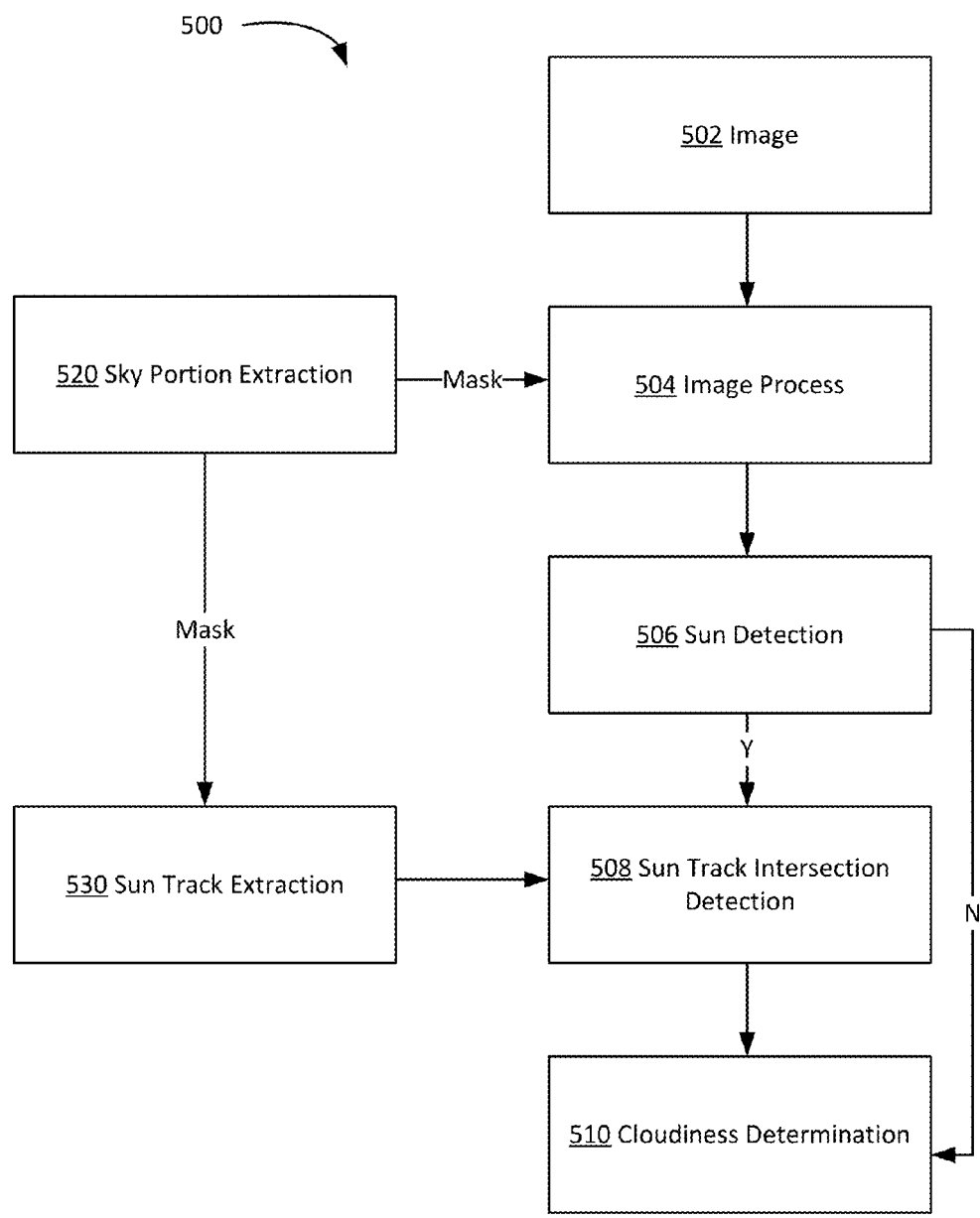
FIG. 5 is a flowchart illustrating an example process for cloud cover determination using image data that may be used in accordance with the present disclosure.

FIG. 5 is a flowchart illustrating an example process 500 for cloudiness determination using image data that may be used in accordance with the present disclosure. The server 120, such as the cloud-based server 200, the computing devices 130, or other computing devices may be used singly or in combination to implement the cloudiness determination process 500. Although depicted as a sequence of operations, those of ordinary skill in the art will appreciate that various embodiments may add, remove, reorder, or modify the depicted operations.

At operation 502, image data corresponding to an image of a view is received. The image data is in a predetermined image format such as RGB (Red, Green, Blue) format. In some embodiments, the image data may be provided by one of the data collection devices 110 or other image capturing devices. In other embodiments, the image data may be provided by the server 120, such as the cloud-based server 200, or other separate cloud storage servers, in which the image data are stored. It should be appreciated that, depending on the image's capture time and location, the cloudiness determination process 500 may be used to determine cloudiness of a given location at different times or cloudiness of different locations at the same time.

At operation 504, a mask image of the same view generated by a sky portion extraction algorithm 520 may be received and overlay the image to define a sky portion of the image. In some examples, the sky portion extraction algorithm 520 may be executed by the same computing device for performing the cloudiness determination process 500. In other examples, the sky portion extraction algorithm 520 may be executed by a separate computing device. The image mask generated by the sky portion extraction algorithm 520 may be obtained by the computing device for executing the cloudiness determination process 500 via the networks 150. In some examples, the mask image generated by the sky portion extraction algorithm 520 may be pre-saved in any suitable storage devices. Embodiments of the sky portion extraction algorithm 520 will be described in greater detail below in reference to FIGS. 9 and 10A-10C.

The sky portion of the image comprises a plurality of data elements, such as pixels. RGB color values of the data elements may be used to classify them into a "cloud" type of data elements and a "clear sky" type of data elements. For example, if color values of a data element satisfy criteria of |R-B|<30 and |B-G|<30, the data element will be classified as a "cloud" type of data element. If, on the other hand, color values of a data element fail to satisfy the criteria of |R-B|<30 and |B-G|<30, the data element will be classified as a "clear sky" type of data element.

However, classifying data elements merely based on color value criteria may lead to mistakenly classifying data elements in a sun portion of an image as "cloud" type of elements. In order to eliminate potential errors, at operation 506, a sun detection algorithm may be used to determine whether the image data comprise a sun portion. Embodiments of the sun detection algorithm will be described in greater detail below in reference to FIG. 8.

At operation 508, a sun track estimated by a sun track extraction algorithm 530 may be received and used to verify whether a sun portion detected at operation 506 is a real one. Embodiments of the sun track extraction algorithm 530 will be described in greater detail below in reference to FIGS. 11 and 12A-12B. In some examples, the sun track extraction algorithm 530 may be executed by the same computing device for performing the cloudiness determination process 500. In other examples, the sun track extraction algorithm 530 may be executed by a separate computing device. The sun track estimated by the sun track extraction algorithm 530 may be obtained by the computing device for executing the cloudiness determination process 500 via the networks 150. In some examples, the sun track estimated by the sun track extraction algorithm 530 may be pre-saved in any suitable storage devices.

It may be determined whether the detected sun portion intersects with the sun track estimated by the sun track extraction algorithm 530. If the detected sun portion intersects with the sun track, it will be verified as a real sun portion, and then data elements forming the sun portion will be changed from the "cloud" type into the "clear sky" type of data elements. On the other hand, a determination that the detected sun portion does not intersect with the sun track indicates that it is not a real sun portion, and data elements forming the detected sun portion will remain as the "cloud" type of data elements.

Figure 6B:
FIG. 6A and FIG. 6B illustrate an image and a representative of the image used for determining cloud cover, respectively.
Figure 6A:

At operation 510, a cloudiness of the sky portion is determined based on a proportion of the "cloud" type of data elements in the plurality of data elements. In some examples, a representative of the image may be generated for determining the cloudiness of the sky portion of the image. FIG. 6A shows an example of an original image 600 that may be captured by one of the data collection devices 110. FIG. 6B shows a representative 610 of the image 600, and the cloudiness of the sky portion is determined as 40.72% in this example. The determined cloudiness value may be stored in any suitable device/system, such as the server 120, including the cloud-based server 200, or other separate storage server or computing device.

Figure 7:
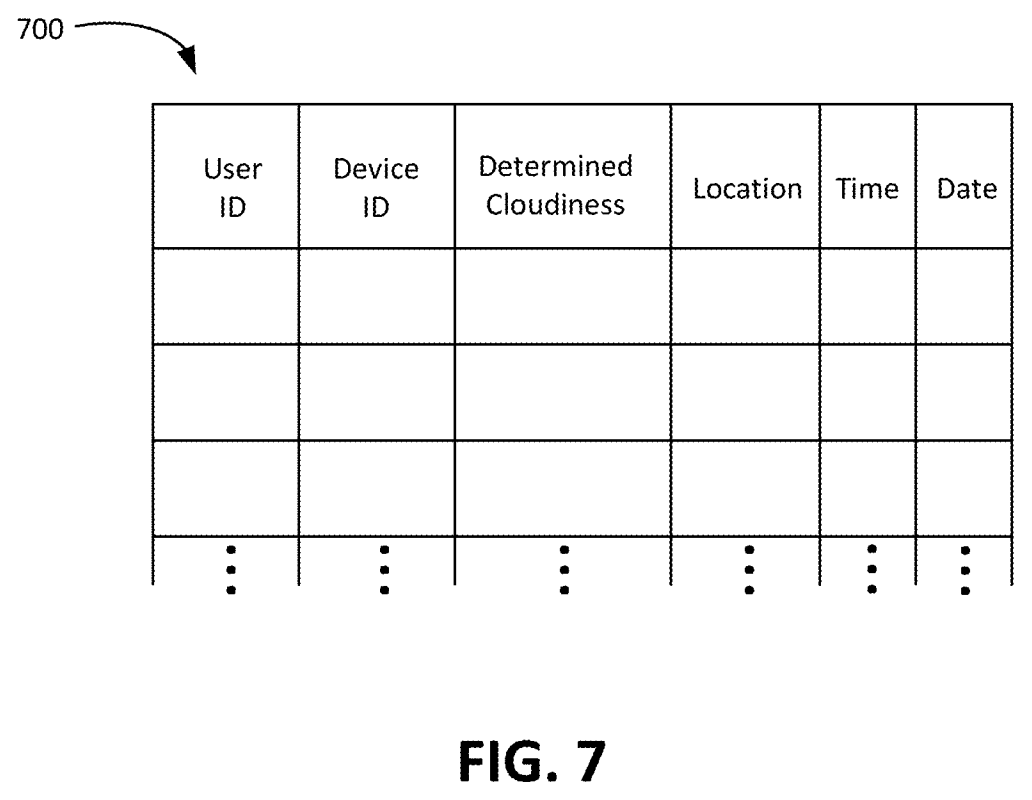

As described above, the data collection devices 110 may be installed anywhere around the world, they may capture numerous image streams for various views of sky. These image streams as well as their corresponding ID, location, time, and date information may be stored in the server 120, such as the cloud-based server 200, or other separate storage servers or computing devices. An aggregate cloudiness of a larger area covered by a plurality of the data collection devices 110 may be calculated based on cloudiness values of neighboring views of sky determined by, for example, the cloudiness determination process 500. One or more cloudiness databases may be created to contain the determined cloudiness values of various views, thereby enabling to obtain any aggregate cloudiness for any area of interest around the world. FIG. 7 is a simplified diagram illustrating example data matrices 700 of a cloudiness database that may be used in accordance with the present disclosure.

Figure 8:
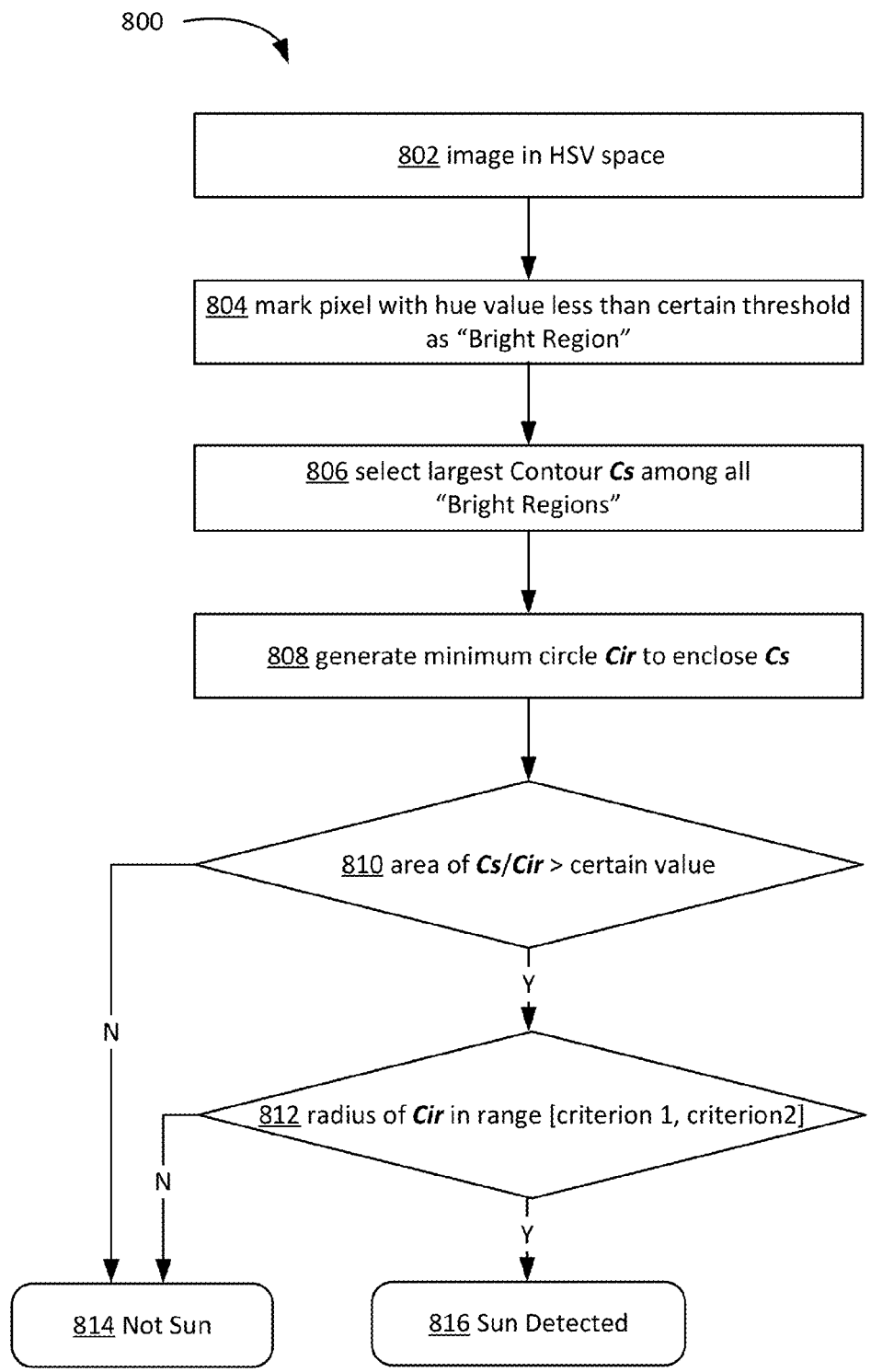
FIG. 8 is a flowchart illustrating an example process for sun detection using image data that may be used in accordance with the present disclosure.

FIG. 8 is a flowchart illustrating an example sun detection process 800 that may be used in accordance with the present disclosure. Although FIG. 8 depicts a sequence of operations, those of ordinary skill in the art will appreciate that various embodiments may add, remove, reorder, or modify the depicted operations. The sun detection process 800 is used to detect a sun portion among image data. In some examples, a mask image generated by a sky portion extraction algorithm according to the present disclosure, such as a sky portion extraction process 900 that will be fully described below, may be used to mask the image so as to define a sky portion of an image before executing the sun detection process 800.

As mentioned above, the sun detection process 800 may be used to implement operation 506 of the cloudiness determination process 500. The sun detection process 800 may also be used as a part of a sun track extraction algorithm in accordance with the present disclosure, such as a sun track extraction process 1100 that will be described below. At operation 802, image data in, for example, HSV (Hue, Saturation, and Value) format is obtained. In some examples, where image data is received in other formats such as RGB format, the image data is preferably converted into HSV format.

At operation 804, if a hue value of a data element, such as a pixel, among the image data is less than a threshold, the data element is marked as one of a "bright region" portion. It is known that a hue value ranges from 0 to 360. By way of example and without limitation, the hue threshold may be set as 10. If a data element's hue value is less than 10, the data element is marked as a data element of a "bright region" portion. Operation 804 is repeated till all data elements among the image data have been processed. After all data elements have been processed by operation 804, a plurality of "bright region" portions may be formed by various sets of neighbouring data elements.

At operation 806, the largest contour area Cs may be identified among all "bright region" portions. In some examples, the contours of the "bright region" portions may be delineated so as to determine the respective contour areas. The "bright region" portion with the largest contour area Cs is selected. At operation 808, the "bright region" portion with the largest contour area Cs is enclosed by a minimum geometric shape. Preferably, the minimum geometric shape is a minimum circle Cir.

Operation 810 determines whether an area ratio of Cs to Cir satisfies a threshold requirement. By way of example and without limitation, the threshold requirement may be set as "greater than 0.5." If the area ratio Cs/Cir satisfies the threshold requirement, the sun detection process 800 may proceed to operation 812. If, on the other hand, the area ratio Cs/Cir fails to satisfy the threshold requirement, the sun detection process 800 may proceed to operation 814, at which it is determined that there is not a sun portion among the image data.

Operation 812 determines whether a radius of the minimum geometric shape, such as the minimum circle Cir, falls within a certain range. By way of example and without limitation, the certain range may be set as "greater than approximately 15 px and less than approximately 100 px." If the radius of the minimum geometric shape, such as the minimum circle Cir, is within the certain range, the sun detection process 800 may proceed to operation 816, at which the "bright region" with the largest contour area Cs is determined as a sun portion. If, on the other hand, the radius of the minimum geometric shape, such as the minimum circle Cir, does not fall within the certain range, the sun detection process 800 may proceed to operation 814, at which it is determined that there is not a sun portion among the image data.

Figure 9:
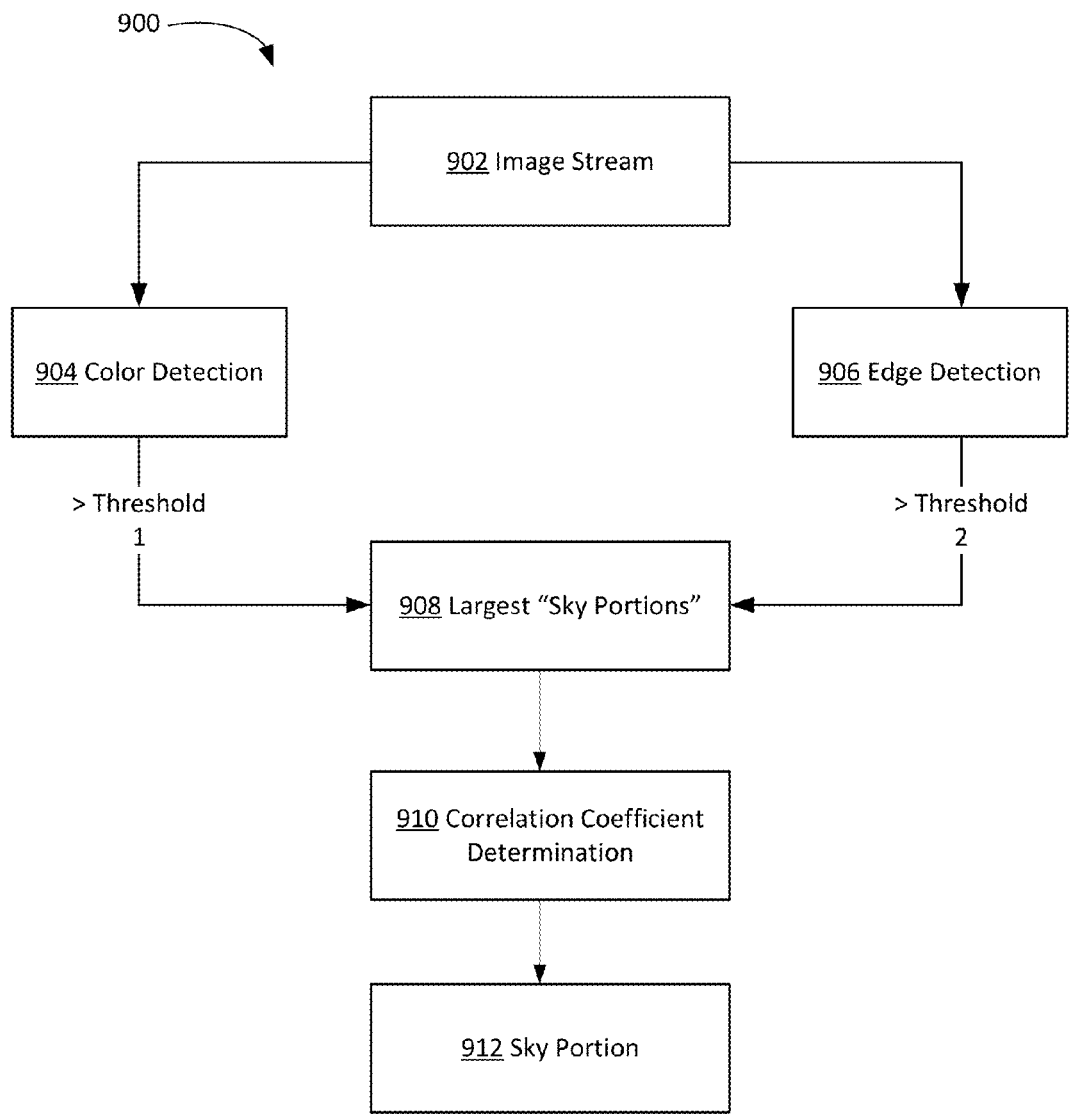
FIG. 9 is a flowchart illustrating an example process for sky region extraction using image stream that may be used in accordance with the present disclosure.

FIG. 9 is a flowchart illustrating an example process 900 for sky portion extraction using image stream that may be used in accordance with the present disclosure. The sky portion extraction process 900 may be performed by the server 120, such as the cloud-based server 200, one of the computing devices 130, or any other suitable computing devices. Although FIG. 9 depicts a sequence of operations, those of ordinary skill in the art will appreciate that various embodiments may add, remove, reorder, or modify the depicted operations. As mentioned above, a sky portion extraction algorithm according to the present disclosure, such as the sky portion extraction process 900, uses a series of images (i.e., image stream) of a view, which may be captured at different times from morning to evening by at least one of the data collection devices 110, to extract a sky portion of the view.

Current sky portion detection technologies mostly base on color or edge information of a single image or use machine learning methods to classify sky portion and non-sky portion. Subject to complex weather conditions, complex edge conditions, and existence of unconnected sky components, current sky portion detection techniques have noticeable drawbacks and cannot accurately detect a sky portion of a view. By contrast, the techniques provided in the present disclosure can accurately identify a sky portion of a view regardless of complex weather conditions (such as sunny, cloudy, and rainy), illumination changes (such as dawn, noon, and evening), and existence of unconnected sky components.

Figure 10A:
FIG. 10A illustrates an example image stream used for sky region extraction.

At operation 902, image data corresponding to a series of time-sequenced images (i.e., image stream) are received. The series of time-sequenced images (i.e., image stream) may be captured at different times of a day by, for example, one of the data collection devices 110. By way of example and without limitation, FIG. 10A illustrates an image streams comprising twenty images that may be used for the sky portion extraction process 900. The received image data may be in RGB format. It should be appreciated that the sky portion extraction process 900, depending on the image stream's capture time and location, may be used to update a sky portion at a given location or extract a sky portion at a different location.

At operation 904, a sky portion among image data corresponding to a single image may be detected based on RGB color values of data elements, such as pixels, of the single image. For instance, a data element may be classified as an element of a sky portion and marked as "1" if RGB color values of the data element satisfy at least one set of the following criteria: (a) R<100, B>100, and (G-R)>20; (b) R<100, G<100, B<100, (B-G) >20, and (G-R) >20; or (c) R>100, G>100, B>100. On the other hand, if RGB color values of a data element fail to satisfy any one set of the above criteria, the data element may be classified as an element of a non-sky portion and marked as "0". It should be appreciated that the color value criteria listed above are merely illustrative and other criteria might be utilized.

At operation 906, one or more edge portions among image data corresponding to a single image may be detected by an edge detection algorithm. By way of example and without limitation, a known Canny edge detector may be used to detect edge portions among the image data. Before implementing Canny edge detection, the image data corresponding to the single image may be converted into grey channel. Then, the image data may be processed by a known bilateral filter that is a non-linear, edge-preserving, and noise-reducing smoothing filter. The bilateral filter may be replaced by any other suitable filters having similar functions. If a data element, such as a pixel, among the image data is detected as a data element of an edge portion, the data element may be marked as "1". On the other hand, if a data element is detected a data element of a non-edge portion, the data element may be marked as "0".

Operations 904 and 906 are repeated till all image data corresponding to every single image among the image stream have been processed. A corresponding data element among the image stream is verified as an element of a sky portion if the corresponding data element is classified as an element of a sky portion more than a first threshold and detected as an element of a non-edge portion more than a second threshold. For instance, in the example of twenty images used for the sky portion extraction process 900, a corresponding data element may be verified as an element of a sky portion if it is classified as an element of a sky portion in more than fifteen images among the twenty images, i.e., the first threshold being 75%, and detected as an element of a non-edge portion in more than ten images among the twenty images, i.e., the second threshold being 50%. It should be appreciated that the first threshold being 75% and the second threshold being 50% are merely illustrative and that they may be set as other values, such as the first threshold being 60% or 80% and the second threshold being 55% or 60%.

On the other hand, if a corresponding data element fails to simultaneously satisfy the first threshold and the second threshold, the corresponding data element is changed into an element of a non-sky portion. A binary representative of the image stream may be generated based on the results of operation 904 and operation 906. In some examples, a generated representative of the image stream may comprise a sky portion including a single sky component. The sky detection process 900 may then stop, and the generated representative may be used as a mask image to define a sky portion of the same view.

Figure 10B:
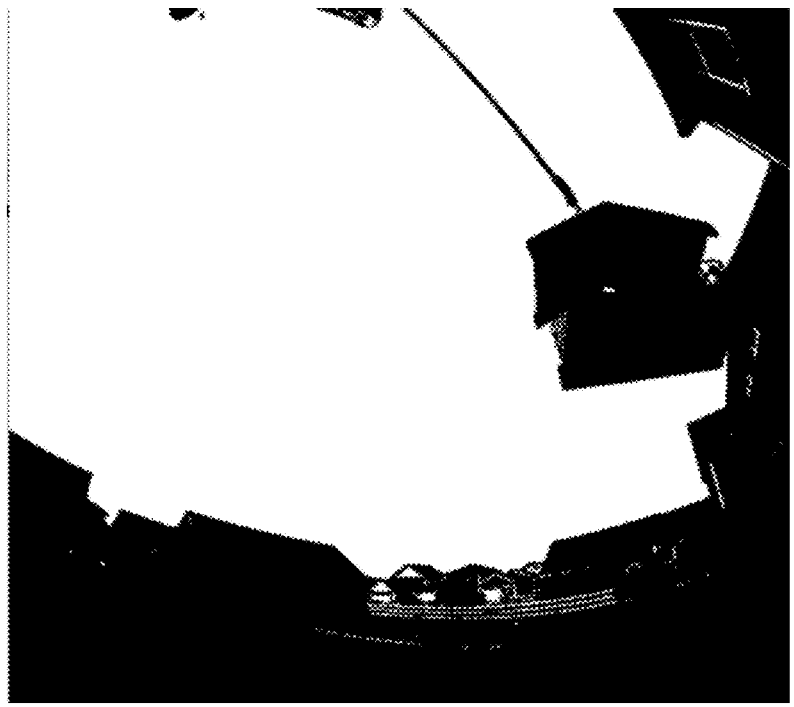
FIG. 10B illustrates an example mask image generated from sky region extraction using image stream.

In other examples, a generated representative of the image stream may comprise a plurality of sky components. As illustrated in FIG. 10B, a representative of the image stream shown in FIG. 10A comprises a plurality of unconnected sky components. Some of the sky components are merely noise components rather than parts of a real sky portion. In this case, the sky detection process 900 may proceed to operations 908.

At operation 908, a certain number of largest sky components are selected, and some of them may be changed into non-sky parts based on their contour areas. The detected edge portions may be delineated so as to define contours of each sky component. By way of example and without limitation, three largest sky components are selected based on contour areas. Other unselected small sky components are changed into non-sky parts. If the contour area of a selected sky component is less than a threshold, such as a quotient of an image's size divided by fifteen (15), the selected sky component is also changed into a non-sky part. If only a sky component remains after such modifications, the sky detection process 900 may stop. On the other hand, if more than one sky components remain, the sky detection process 900 may then proceed to operations 910.

At operation 910, correlation coefficient between each remained sky component and the largest sky component is determined. The largest sky component may be assumed as a real sky component. In some embodiments, correlation coefficient may be determined based on (B-R) values. If the (B-R) values of a remained sky component are highly correlated with the (B-R) values of the largest sky component, the remained sky component is verified as a real sky component. Otherwise, the remained sky component is changed into a non-sky part. By way of example and without limitation, if the color correlation coefficient of a remained sky component relative to the largest sky component is greater than 0.5, it may be determined that the remained sky component is highly color correlated with the largest sky component. It should be appreciated that using color values to determine correlation coefficient is merely illustrative and that any other suitable parameter, such as shape and texture of sky components, may be used to determine correlation coefficient between a remained sky component and the largest sky component in accordance with the present disclosure.

Figure 10C:
FIG. 10C illustrates an example modified mask image generated from sky region extraction using image stream.

At operation 912, one or more sky components are verified as real ones that constitute the sky portion of the view. A modified mask image is generated, and the modified mask image comprises a sky portion including the verified sky components. FIG. 10C illustrates a modified mask image in which a sky portion comprises two unconnected sky components.

A mask image of a particular view generated by the sky portion extraction process 900 can be updated anytime based on a new image stream of the particular view. As mentioned above, a mask image of a view generated by the sky portion extraction process 900 may be used to define a sky portion of any image of the view. A mask image generated by the sky portion extraction process 900 may be employed in the cloudiness determination process 500. A mask image generated by the sky portion extraction process 900 may also be utilized in a sun track extraction process that will be described below.

Figure 11:
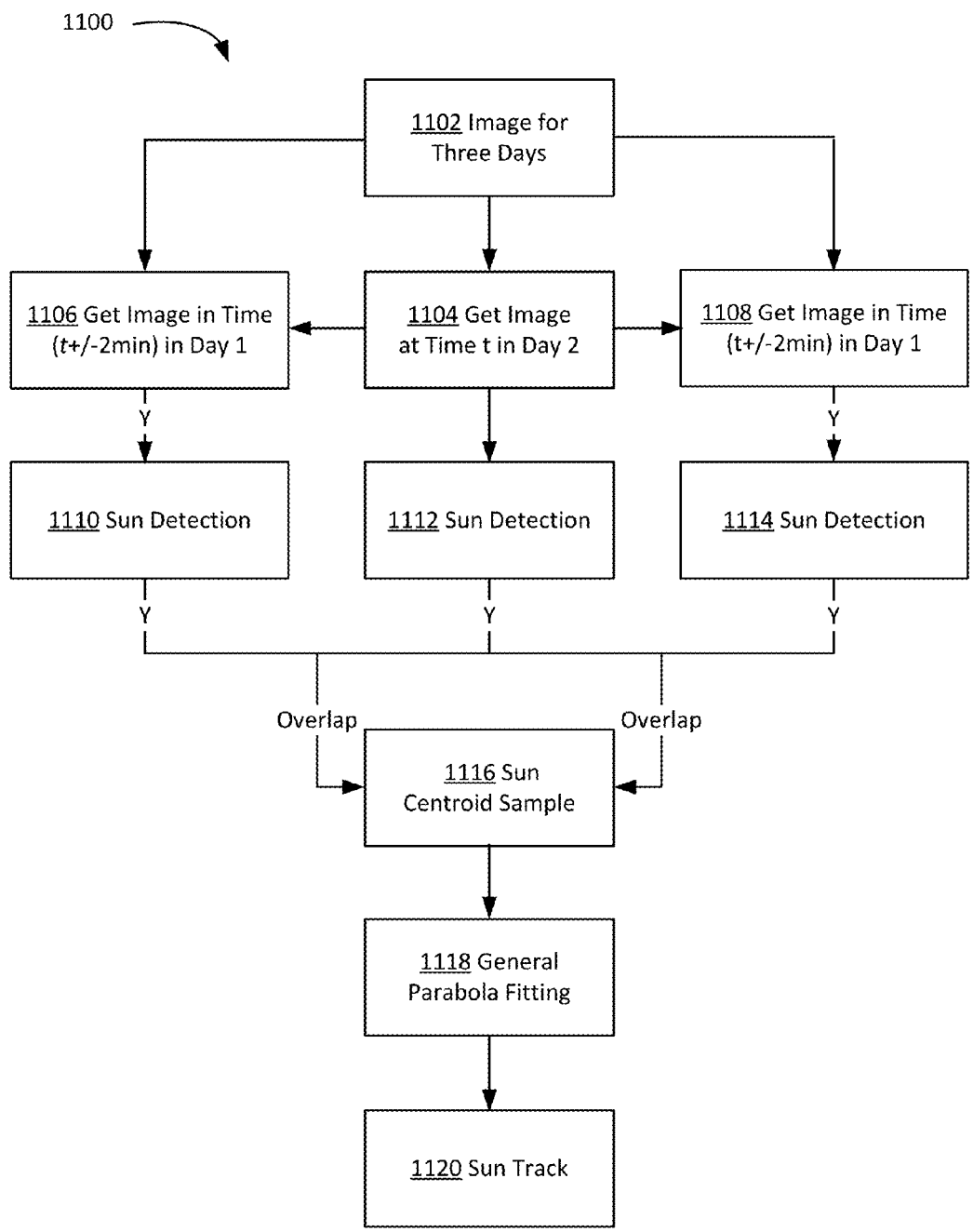
FIG. 11 is a flowchart illustrating an example process for sun track extraction using image streams that may be used in accordance with the present disclosure.

FIG. 11 is a flowchart illustrating an example process 1100 for sun track extraction using image streams that may be used in accordance with the present disclosure. The sun track extraction process 1110 may be performed by any computing systems or devices, such as the server 120, including the cloud-based server 200, and the computing devices 130. In some examples, the sun track extraction process 1100 may be executed by a computing device separate from the computing system that performs a cloudiness determination algorithm according to the present disclosure, such as the cloudiness determination process 500. A sun track estimated by the sun track extraction process 1100 may be obtained by the computing system executing the cloudiness determination algorithm via the networks 150. Although FIG. 11 depicts a sequence of operations, those of ordinary skill in the art will appreciate that various embodiments may add, remove, reorder, or modify the depicted operations.

At operation 1102, the sun track extraction process 1100 may begin with receiving image streams of a view. The image streams may be captured by at least one of the data collection devices 110. Preferably, the sun track extraction process 1100 uses daytime image streams of a view captured during previous days to estimate a successive day's sun track of the view.

Figure 12A:
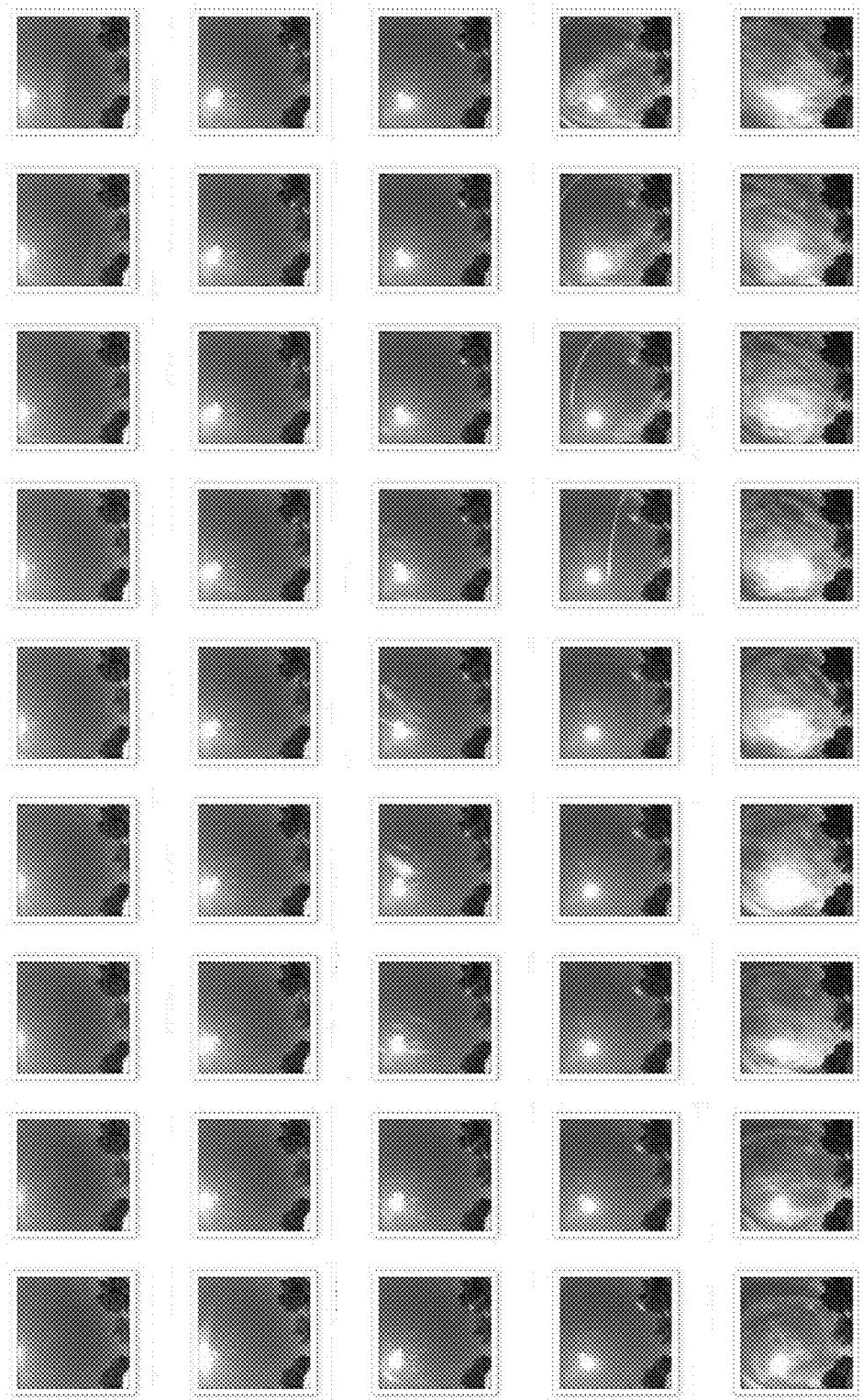
FIGS. 12A-12B illustrate an example image stream used for sun track extraction.
Figure 12B:
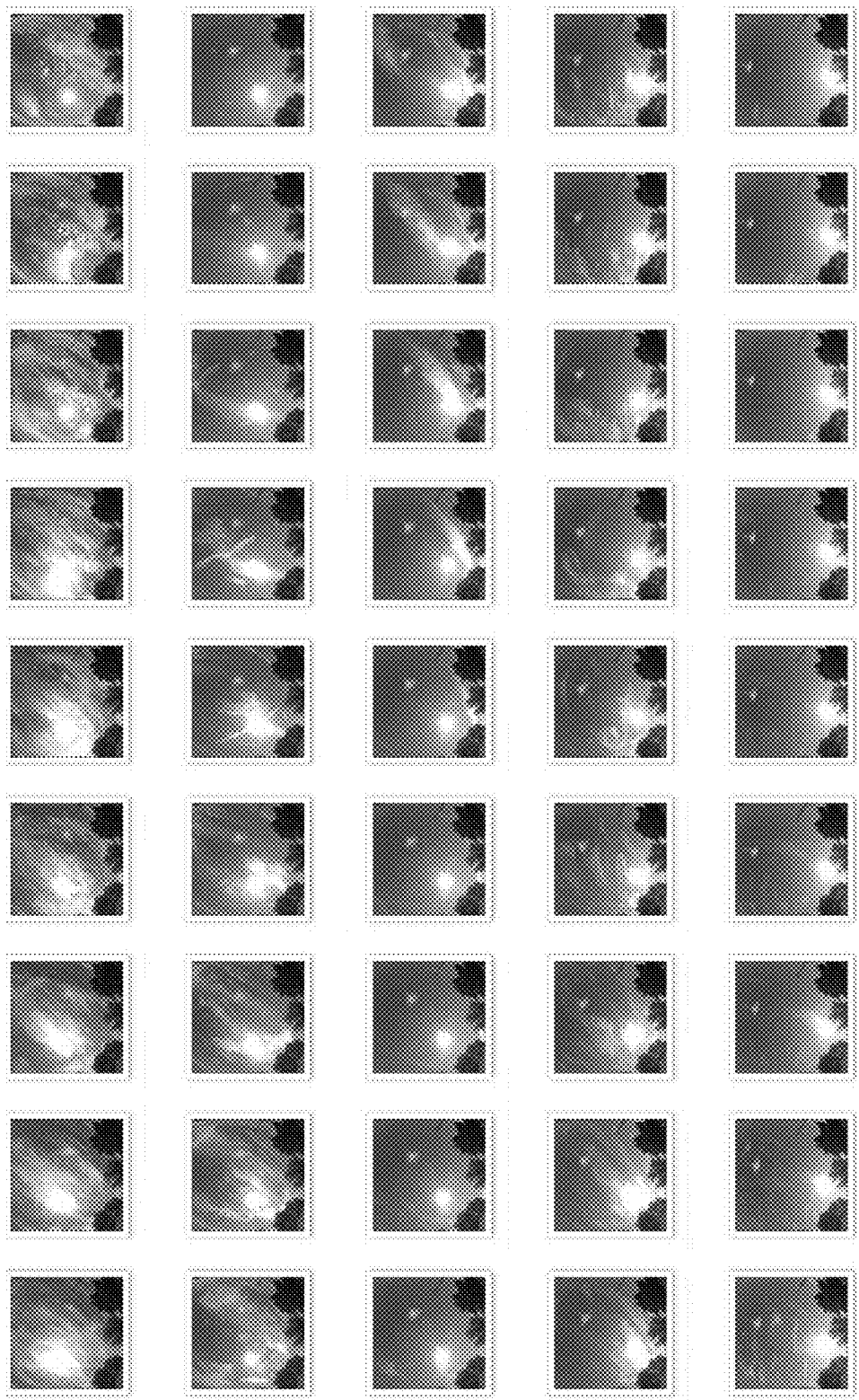

In an embodiment illustrated in FIG. 11, the sun track extraction process 1100 uses previous three days' image streams of a view to estimate the forth day's sun track of the view. The image streams captured in three successive days may be referred herein as Day 1 image library, Day 2 image library, and Day 3 image library, respectively. FIGS. 12A-12B illustrate an example of Day 2 image library in which images were captured on Jul. 31, 2015. In this embodiment, it would be understood that images of the same view captured on Jul. 30, 2015 (Day 1), Jul. 31, 2015 (Day 2), and Aug. 1, 2015 (Day 3) may be used to estimate the sun track on Aug. 2, 2015.

It should be appreciated that using three successive days' image streams is merely illustrative and that any number of days' image streams, such as two or five successive days, may be used for sun track extraction in accordance with the present disclosure. In some examples, a mask image generated by a sky portion extraction algorithm according to the present disclosure, such as the sky portion extraction process 900, may be received and used to define a sky portion of each image among the image streams.

At operation 1104, a first image captured at time t may be selected from Day 2 image library. At operations 1106 and 1108, Day 1 and Day 3 image libraries are searched to identify images that are captured within a certain period close to the time t, such as within a time period of t+/−2 minutes. If corresponding images are identified at operations 1106 and 1108, the process 1100 may then proceed to operations 1110, 1112, and 1114. It should be appreciated that the time period of t+/−2 minutes is merely illustrative and that other certain time period might be utilized.

At operations 1110, 1112, and 1114, a sun detection algorithm according to the present disclosure, such as the sun detection process 800, may be employed to determine whether the first image and the corresponding images comprise respective sun portions. If a sun portion is detected in the first image from Day 2 image library while at least a sun portion is simultaneously detected in either the corresponding image from Day 1 image library or the corresponding image from Day 3 image library, the process 1100 may then proceed to determine whether the sun portion of the first image overlaps the at least a sun portion of the corresponding images.

Figure 12C:
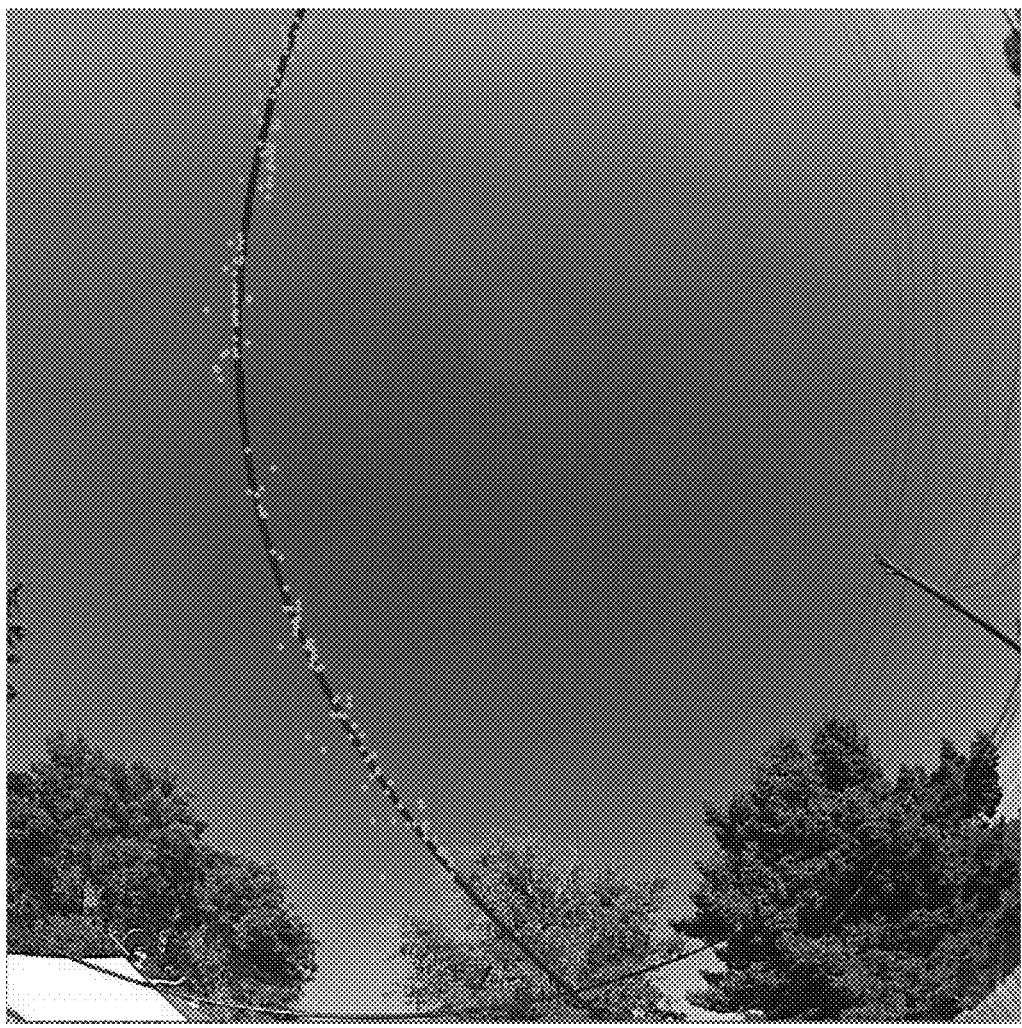
FIG. 12C illustrates an example sun track generated from sun track extraction using image streams.

At operation 1116, a centroid of the overlapped sun portions is identified. The identified centroid is marked as a sample. Operations 1102 through 1116 are repeated till all images in Day 2 image library have been selected. Then, a plurality of centroid samples may be available. If the number of the centroid samples is greater than a certain value, such as ten (10), the process 1100 may proceed to operation 1118. Operation 1118 may use a general parabola fitting method to fit the multiple centroid samples by introducing angular rotation. By way of example and without limitation, a known Nelder-Mead Simplex algorithm may be used to minimize the residuals of the least-squares fit and optimize function by utilizing angular rotation as unknown parameters. At operation 1120, a smooth curve is generated to denote a sun track based on the centroid samples. FIG. 12C illustrates an example of a sun track generated by the sun track extraction process 1100.

Image-based information extraction algorithms as described above in different embodiments may be implemented in a number of different types of computing devices, for example, computer servers, network devices, storage devices, and the like. Various computing devices may be used singly or in combination to execute the image-based information extraction algorithms, such as the cloudiness determination process 500, the sun detection process 800, the sky portion extraction process 900, and the sun track extraction process 1100. As set forth above, image streams that are used to extract information may be captured by the data collections 110 or other suitable data capturing devices.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments.

It will also be appreciated that various items, such as image data, associated ID and location information, and extracted information, are illustrated as being stored in memory or on storage while being used, and that these items or portions thereof may be transferred between memory and other storage devices for purposes of memory management and data integrity. Alternatively, in other embodiments some or all of software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc.

Some or all of the modules, systems, and data structures may also be stored (e.g., as software instructions or structured data) on a non-transitory computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of extracting a sky portion, comprising:
   receiving a plurality of images, the plurality of images time-sequenced and the plurality of images each comprising a plurality of corresponding data elements, wherein the plurality of corresponding data elements each share a same position among the plurality of images;

identifying a plurality of candidate data elements among the plurality of corresponding data elements of each image among the plurality of images based on color values;

identifying a plurality of second type of data elements among the plurality of corresponding data elements of each image among the plurality of images by an edge detector;

determining a first number of images among the plurality of images, wherein a corresponding data element is identified as a candidate data element among the plurality of candidate data elements of each of the first number of images;

determining a second number of images among the plurality of images, wherein the corresponding data element is identified as a second type of data element among the plurality of second type of data elements of each of the second number of images;

determining that the corresponding data element is a first type of data element in response to a first determination that the first number of images is greater than a first threshold and a second determination that the second number of images is greater than a second threshold; and generating a representative of the plurality of images based on a plurality of determined first type of data elements, the representative comprising at least a set of neighbouring first type of data elements among the plurality of determined first type of data elements indicative of at least a sky component.

2. The method of claim 1, wherein the generated representative comprises a plurality of sets of neighbouring first type of data elements among the plurality of determined first type of data elements indicative of a plurality of sky components.

3. The method of claim 2, further comprising:
identifying a first sky component among the plurality of sky components, the first sky component having a largest area among the plurality of sky components.

4. The method of claim 3, further comprising:
removing a second sky component from the plurality of sky components in response to a determination that the second sky component has an area less than a third threshold.

5. The method of claim 4, further comprising:
determining a correlation coefficient of a third sky component among the plurality of sky components relative to the first sky component, the third sky component having an area greater than the third threshold;
removing the third sky component from the plurality of sky components in response to a determination that the correlation coefficient is less than a forth threshold; and
generating a modified representative by removing the second sky component and the third sky component from the generated representative, the modified representative comprising remaining sky components.

6. The method of claim 5 wherein the correlation coefficient is based on color values.

7. A system of extracting a sky portion, comprising:
at least a processor; and
at least a memory communicatively coupled to the at least a processor to configure the at least a processor to:
receive a plurality of images, the plurality of images time-sequenced and the plurality of images each comprising a plurality of corresponding data elements, wherein the plurality of corresponding data elements each share a same position among the plurality of images;

identify a plurality of candidate data elements among the plurality of corresponding data elements of each image among the plurality of images based on color values;

identify a plurality of second type of data elements among the plurality of corresponding data elements in each image among the plurality of images by an edge detector;

determine a first number of images among the plurality of images, wherein a corresponding data element is identified as a candidate data element among the plurality of candidate data elements of each of the first number of images;

determine a second number of images among the plurality of images, wherein the corresponding data element is identified as a second type of data element among the plurality of second type of data elements of each of the second number of images;

determine that the corresponding data element is a first type of data element in response to a first determination that the first number of images is greater than a first threshold and a second determination that the second number of images is greater than a second threshold; and generate a representative of the plurality of images based on a plurality of determined first type of data elements, the representative comprising at least a set of neighbouring first type of data elements among the plurality of determined first type of data elements indicative of at least a sky component.

8. The system of claim 7, wherein the generated representative comprises a plurality of sets of neighbouring first type of data elements among the plurality of determined first type of data elements indicative of a plurality of sky components.

9. The system of claim 8, the at least a memory further configuring the at least a processor to:
identify a first sky component among the plurality of sky components, the first sky component having a largest area among the plurality of sky components.

10. The system of claim 9, the at least a memory further configuring the at least a processor to:
remove a second sky component from the plurality of sky components in response to a determination that the second sky component has an area less than a third threshold.

11. The system of claim 10, the at least a memory further configuring the at least a processor to:
determine a correlation coefficient of a third sky component among the plurality of sky components relative to the first sky component, the third sky component having an area greater than the third threshold;
remove the third sky component from the plurality of sky components in response to a determination that the correlation coefficient is less than a forth threshold; and
generate a modified representative by removing the second sky component and the third sky component from the generated representative, the modified representative comprising remaining sky components.

12. A non-transitory computer-readable storage medium bearing computer-readable instructions that upon execution on a computing device cause the computing device at least to:

receive a plurality of images, the plurality of images time-sequenced and the plurality of images each comprising a plurality of corresponding data elements, wherein the plurality of corresponding data elements each share a same position among the plurality of images;

identify a plurality of candidate data elements among the plurality of corresponding data elements of each image among the plurality of images based on color values;

identify a plurality of second type of data elements among the plurality of corresponding data elements of each image among the plurality of images by an edge detector;

determine a first number of images among the plurality of images, wherein a corresponding data element is identified as a candidate data element among the plurality of candidate data elements of each of the first number of images;

determine a second number of images among the plurality of images, wherein the corresponding data element is identified as a second type of data element among the plurality of second type of data elements of each of the second number of images;

determine that the corresponding data element is a first type of data element in response to a first determination that the first number of images is greater than a first threshold and a second determination that the second number of images is greater than a second threshold; and generate a representative of the plurality of images based on a plurality of determined first type of data elements, the representative comprising at least a set of neighbouring first type of data elements among the plurality of determined first type of data elements indicative of at least a sky component.

13. The non-transitory computer-readable storage medium of claim 12, wherein the generated representative comprises a plurality of sets of neighbouring first type of data elements among the plurality of determined first type of data elements indicative of a plurality of sky components.

14. The non-transitory computer-readable storage medium of claim 13, further comprising computer-readable instructions that upon execution on the computing device cause the computing device at least to:
identify a first sky component among the plurality of sky components, the first sky component having a largest area among the plurality of sky components.

15. The non-transitory computer-readable storage medium of claim 14, further comprising computer-readable instructions that upon execution on the computing device cause the computing device at least to:
remove a second sky component from the plurality of sky components in response to a determination that the second sky component has an area less than a third threshold.

16. The non-transitory computer-readable storage medium of claim 15, further comprising computer-readable instructions that upon execution on the computing device cause the computing device at least to:
determine a correlation coefficient of a third sky component relative to the first sky component, the third sky component having a area greater than a third threshold;
remove the third sky component from the plurality of sky components in response to a determination that the correlation coefficient is less than a forth threshold; and
generate a modified representative by removing the second sky component and the third sky component from the generated representative, the modified representative comprising remaining sky components.

* * * * *

UNITED STATES PATENT AND TRADEMARK OFFICE
CERTIFICATE OF CORRECTION

PATENT NO. : 9,792,522 B2
APPLICATION NO. : 14/956166
DATED : October 17, 2017
INVENTOR(S) : Xinning Shen and Wei Chu Page 1 of 1

It is certified that error appears in the above-identified patent and that said Letters Patent is hereby corrected as shown below:

On the Title Page

Please remove the "." after the word "Inc." in Items (71) and (73)

Signed and Sealed this
Fourth Day of February, 2020

Andrei Iancu
*Director of the United States Patent and Trademark Office*